(12) United States Patent
Stokes et al.

(10) Patent No.: US 10,544,521 B2
(45) Date of Patent: Jan. 28, 2020

(54) COPOLYMER MEMBRANES, FIBERS, PRODUCTS AND METHODS

(71) Applicant: Celgard, LLC, Charlotte, NC (US)

(72) Inventors: Kristoffer K. Stokes, Lunenburg, MA (US); Xiaomin Zhang, Charlotte, NC (US); Karl F. Humiston, Tucson, AZ (US)

(73) Assignee: Celgard, LLC, Charlotte, NC (US)

( * ) Notice: Subject to any disclaimer, the term of this patent is extended or adjusted under 35 U.S.C. 154(b) by 0 days.

(21) Appl. No.: 15/695,348

(22) Filed: Sep. 5, 2017

(65) Prior Publication Data

US 2017/0362745 A1 Dec. 21, 2017

Related U.S. Application Data

(62) Division of application No. 14/072,117, filed on Nov. 5, 2013, now Pat. No. 9,783,914.

(60) Provisional application No. 61/723,058, filed on Nov. 6, 2012, provisional application No. 61/892,730, filed on Oct. 18, 2013.

(51) Int. Cl.
*D01F 6/46* (2006.01)
*D01F 6/30* (2006.01)

(52) U.S. Cl.
CPC ............... *D01F 6/46* (2013.01); *D01F 6/30* (2013.01); *Y10T 428/249921* (2015.04); *Y10T 428/2975* (2015.01)

(58) Field of Classification Search
CPC .... D01F 6/46; D01F 6/30; Y10T 428/249921; Y10T 428/2975; A41D 2400/22
See application file for complete search history.

(56) References Cited

U.S. PATENT DOCUMENTS 5,238,735 A * 8/1993 Nagou ................. B01D 69/141
428/304.4
5,565,281 A * 10/1996 Yu ......................... B29C 55/005
429/62

(Continued)

OTHER PUBLICATIONS

"Copolymer"; Wikipedia the free encyclopedia (2016).

*Primary Examiner* — David Sample
*Assistant Examiner* — Donald M Flores, Jr.
(74) *Attorney, Agent, or Firm* — Hammer & Associates, P.C.

(57) ABSTRACT

In accordance with at least selected embodiments, the present invention is directed to novel, improved, or modified porous membranes, fibers, porous fibers, products made from such membranes, fibers or porous fibers, and/or related methods of production, use, and/or the like. In accordance with at least certain embodiments, the present invention is directed to novel, improved, or modified microporous membranes or films, fibers, microporous fibers, materials or layers made from such membranes, fibers or porous fibers, and the like for use in textile materials, garments, products, and/or textile related applications. Microporous membranes, fibers, and/or microporous fibers are made of one or more copolymers, such as block or impact copolymers, or of at least one polyolefin combined with at least one copolymer as a means of improving the hand, drape, and/or surface coefficient of friction performance properties for use in textile garments, textile materials or textile related applications.

7 Claims, 5 Drawing Sheets

"-A-A-B-B-A-A-B-B-A-A-"

"-A-A-A-A-B-B-B-B-"

"A-A-B-B-B-B-A-A-B-B-B-A-A-"

Where A= Monomer A and B= Monomer B

Examples of Types of Block Copolymers.

(56) References Cited

U.S. PATENT DOCUMENTS

| | | | |
|---|---|---|---|
| 5,691,077 A * | 11/1997 | Yu | B01D 67/0027 |
| | | | 428/516 |
| 5,910,225 A | 6/1999 | McAmish et al. | |
| 6,861,132 B2 | 3/2005 | Ikeda et al. | |
| 8,968,632 B2 | 3/2015 | Kochem et al. | |
| 2003/0148091 A1 | 8/2003 | Ikeda et al. | |
| 2006/0014897 A1 | 1/2006 | Mylure et al. | |
| 2007/0196638 A1 | 8/2007 | Wei et al. | |
| 2008/0269366 A1 * | 10/2008 | Shaffer | C08L 53/02 |
| | | | 521/134 |
| 2009/0029098 A1 | 1/2009 | Ashbaugh et al. | |
| 2009/0258560 A1 | 10/2009 | Kristiansen et al. | |
| 2011/0060103 A1 * | 3/2011 | Marchand | C08F 297/08 |
| | | | 525/53 |
| 2011/0136950 A1 | 6/2011 | Yu et al. | |
| 2011/0223486 A1 | 9/2011 | Zhang et al. | |

* cited by examiner

"-A-A-B-B-A-A-B-B-A-A-"

"-A-A-A-A-B-B-B-B-"

"A-A-B-B-B-B-A-A-B-B-B-B-A-A-"

Where A= Monomer A and B= Monomer B

Figure 1. Examples of Types of Block Copolymers.

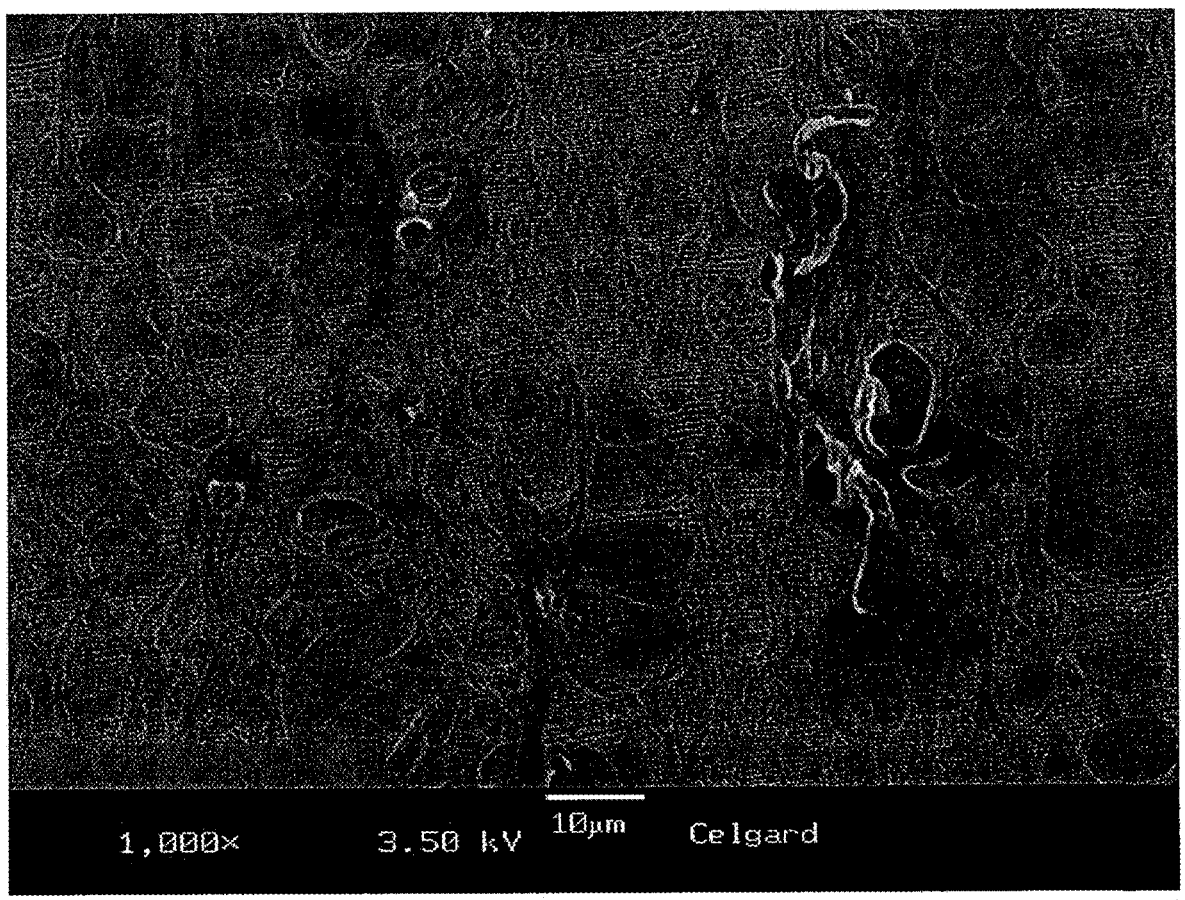
Figure 2. Surface SEM Micrograph of Example 5 at 1,000x Magnification.

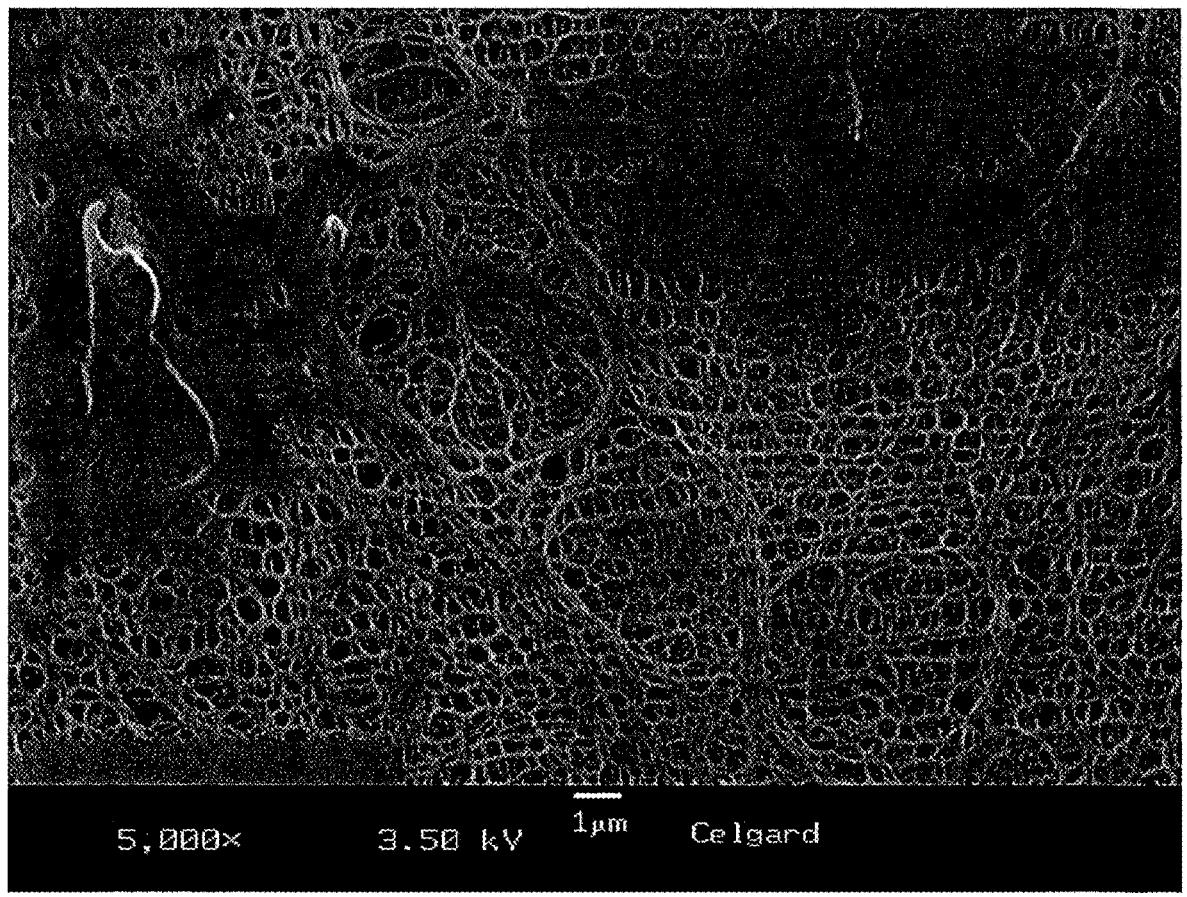
Figure 3. Surface SEM Micrograph of Example 5 at 5,000x Magnification..

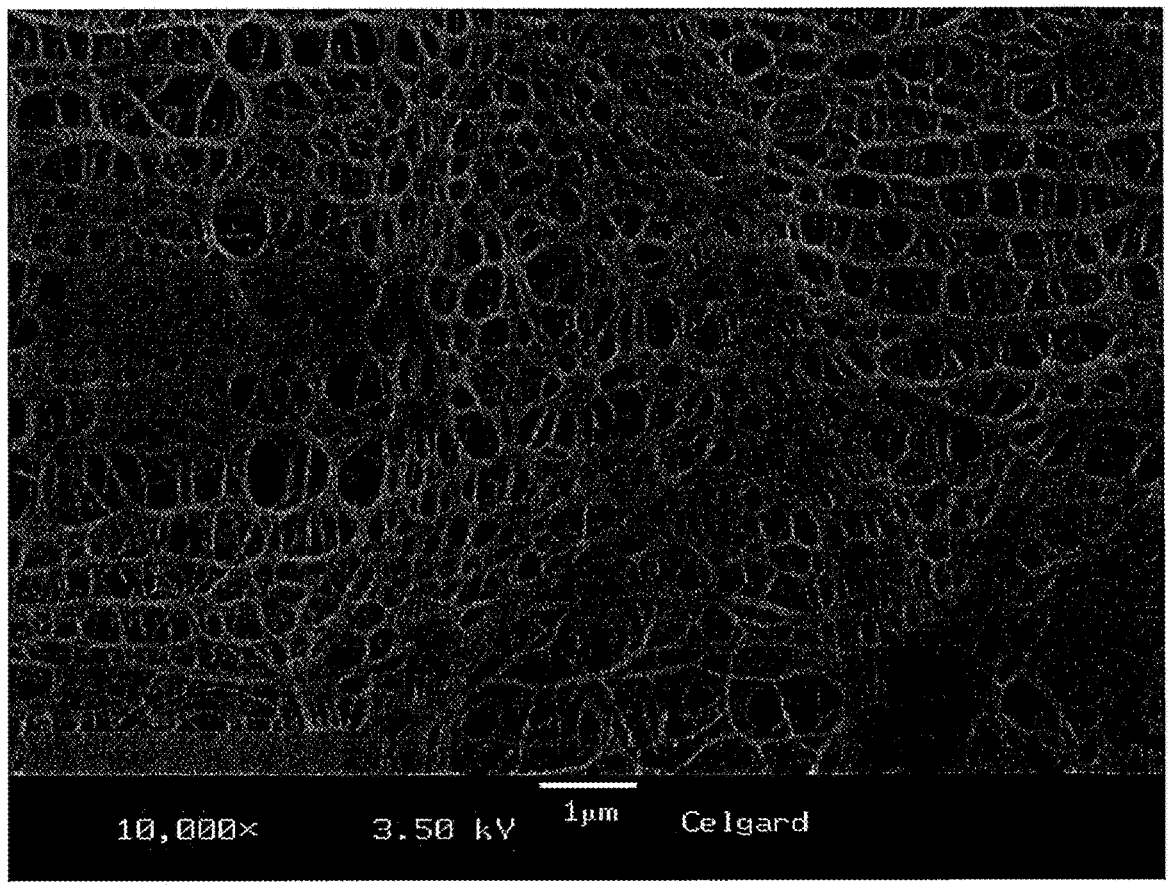
Figure 4. Surface SEM Micrograph of Example 5 at 10,000x Magnification.

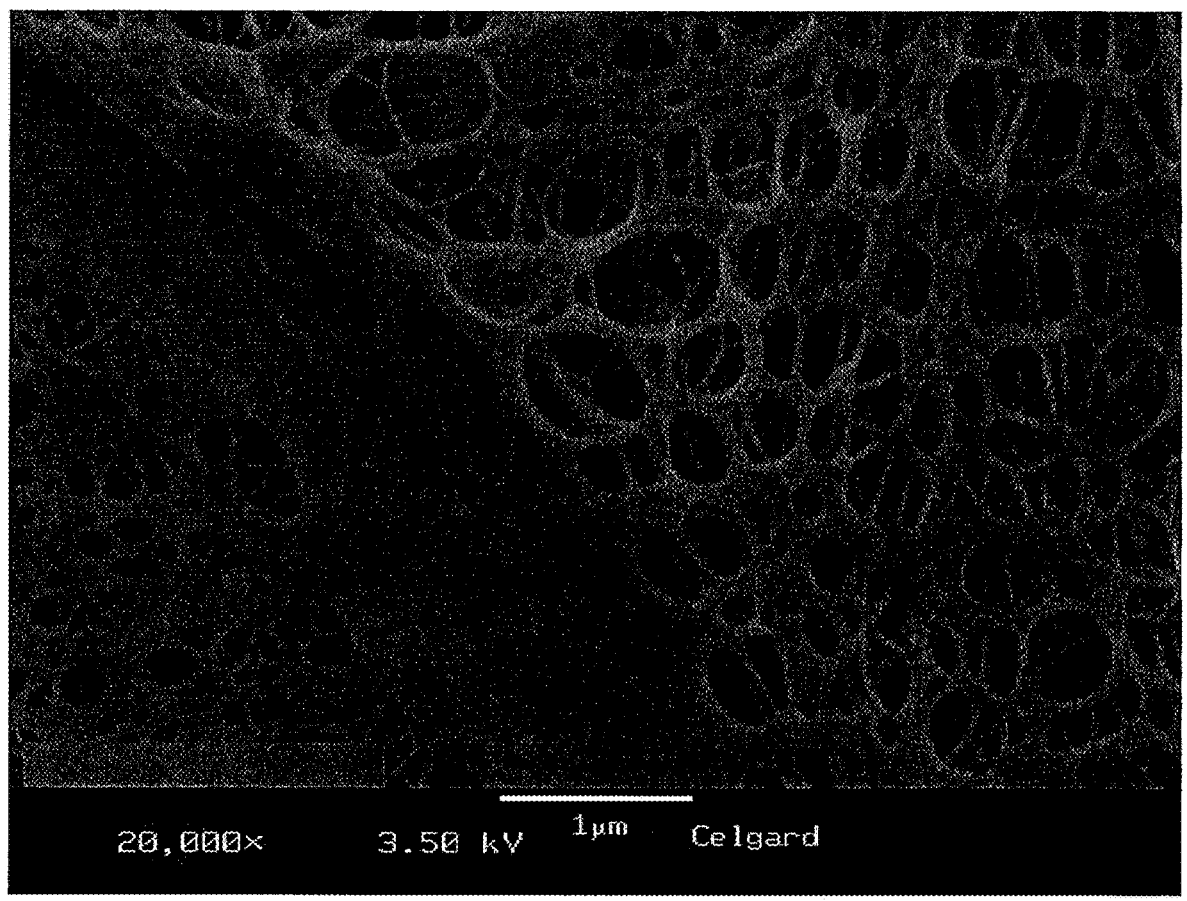
Figure 5. Surface SEM Micrograph of Example 5 at 20,000x Magnification.

COPOLYMER MEMBRANES, FIBERS, PRODUCTS AND METHODS

CROSS REFERENCE TO RELATED APPLICATIONS

This application is a divisional application based on U.S. application Ser. No. 14/072,117 filed Nov. 5, 2013, now U.S. Pat. No. 9,783,914, which claims priority to and the benefit of U.S. Provisional Application Ser. No. 61/723,058 filed Nov. 6, 2012 and of U.S. Provisional Application Ser. No. 61/892,730 filed Oct. 18, 2013, both and each of which are incorporated by reference herein.

FIELD OF THE INVENTION

In accordance with at least selected embodiments, the present invention is directed to novel, improved, or modified porous membranes, fibers, porous fibers, products made from such membranes, fibers or porous fibers, and/or related methods of production, use, and/or the like. In accordance with at least certain embodiments, the present invention is directed to novel, improved, or modified microporous membranes or films, fibers, microporous fibers, materials or layers made from such membranes, fibers or porous fibers, and the like for use in textile materials, garments, products, and/or textile related applications. In accordance with at least certain selected embodiments, the present invention is directed to novel, improved, or modified microporous membranes or films, fibers or microporous fibers, such as solid or hollow fibers, microporous hollow fibers, shaped fibers, materials, layers, or textiles made from such fibers or membranes, including wovens, nonwovens, knits, bonded, flocked, and/or other textiles, laminates, composites, garments, and/or the like and which membranes, fibers, or porous fibers are preferably made of or comprised of one or more copolymers such as block copolymers or impact copolymers preferably comprising or consisting of two or more polyolefin monomer types or which membranes, fibers, or porous fibers are preferably made of a polymer such as one or more polyolefins together with one or more copolymers such as block copolymers or impact copolymers preferably comprising or consisting of two or more polyolefins. In accordance with at least particular embodiments, the present invention is directed to novel, improved or modified microporous membranes or films, fibers or microporous fibers which are comprised of a polyolefin in combination with or blended with one or more block copolymers or impact copolymers as a means of improving the composition, characteristics, performance, and/or properties of the membranes, fibers, porous fibers, materials, layers or textiles made from such membranes, fibers or porous fibers, for example, improving the characteristics, performance, and/or properties such as hand, drape, quietness, and/or surface coefficient of friction of the membranes, fibers, materials, layers or textiles such as microporous polyolefin membranes and/or polyolefin fibers in or for textiles or textile end use applications. In accordance with at least particular selected embodiments, the present invention is directed to novel, improved or modified polyolefin materials or compositions in which one or more polyolefins are combined or blended with one or more block or impact copolymers. In addition, in accordance with at least particular certain embodiments, the present invention is directed to novel, improved or modified polyolefin materials or compositions in which one or more polyolefins are combined or blended with one or more, preferably one or more, block or impact copolymers, and where the blend or combination influences the performance properties of hand, drape, 'quietness' with movement, and/or surface coefficient of friction of microporous polyolefin membranes, materials, layers, and/or fibers made from such polyolefin materials or compositions and are used in or for textile products and/or textile related end use applications.

BACKGROUND OF THE INVENTION

At least certain polyolefin (PO) microporous membranes and microporous fibers (or materials made therefrom) are known to be waterproof (or at least water resistant) and air permeable due to their chemical composition and structure. Examples of such polyolefin (PO) microporous membranes and hollow fibers known to be waterproof (or water resistant) and air permeable are Celgard® Z-series membranes or Celgard® hollow fibers produced by Celgard, LLC of Charlotte, N.C.

Typically, polyolefin microporous membranes and fibers are thought to be undesirably stiff and plastic-like and as such may not be commonly used in textile garments and/or related textile materials, laminates, or products or in other textile end uses or applications.

For at least certain conditions or applications, such as certain textile materials or uses, a need exists for novel, improved or modified polyolefin microporous membranes, polyolefin fibers, and/or polyolefin microporous fibers, and/or materials, layers, and/or textiles made therefrom having novel, improved or modified compositions, characteristics, performance, and/or properties such as improved, modified, better, or good hand, soft drape, 'quietness' with movement, and/or lower surface coefficient of friction that may be desirable in at least certain textiles, garments and/or related end use applications.

SUMMARY OF THE INVENTION

In accordance with at least selected embodiments, the present invention may address the above needs or issues and is directed to novel, improved or modified microporous membranes, fibers and/or microporous fibers for use in textiles, garments, textile garments, textile materials, or textile related applications. In accordance with at least certain embodiments, the present invention is directed to novel, improved or modified microporous membranes or films, fibers and/or microporous fibers which are comprised of one or more polyolefins (POs), one or more copolymers such as block or impact copolymers preferably of polypropylene (PP) and polyethylene (PE), or one or more polyolefins (POs) mixed or blended with one or more copolymers such as block or impact copolymers preferably of polypropylene (PP) and polyethylene (PE). In accordance with at least certain embodiments, the present invention is directed to novel, improved, and/or modified porous membranes or films, fibers, and/or porous fibers made of or comprised of a polyolefin and one or more block or impact copolymers which preferentially are made of polypropylene and polyethylene, or to materials, layers or textiles, laminates, composites, and/or the like made from such membranes, films, fibers, or hollow fibers that are themselves made of or comprised of a polyolefin and one or more block or impact copolymers which preferentially are made of polypropylene and polyethylene.

In another embodiment, the present invention is directed to novel, improved and/or modified membranes, films and/or fibers, such as microporous membranes, fibers and/or microporous fibers which are comprised of a polyolefin in combination with one or more block copolymers such as impact copolymers where the polyolefins in the copolymers include, but are not limited to, polypropylene, polyethylene, poly 1-butene, poly-4-methyl-1 pentene, polyhexene, polyoctene and/or blends, mixtures, or combinations thereof. When a polyolefin membrane or fiber is made of a polyolefin combined with one or more block or impact copolymers, the modified membrane or fiber offers or provides for methods for designing modified microporous membranes, fibers or microporous fibers, or materials, layers, composites, laminates, or textiles with targeted, enhanced performance properties in or for textile related end use applications. Tailoring the choice of composition, in the chemical structure of the polymeric blend or composition of the inventive modified composition, membrane or fiber, or material, layer, composite, laminate, or textile made therewith or therefrom can influence performance properties such as hand, drape, 'quietness' with movement, and surface coefficient of friction thereby producing microporous polyolefin membranes, fibers, microporous fibers, or materials, layers, composites, laminates, or textiles with better hand, softer drape, quieter movement, and/or lower coefficient of friction resulting in, for example, a silkier touch.

In accordance with at least selected embodiments, the present invention is directed to novel, improved, or modified porous membranes, fibers, porous fibers, products made from such membranes, fibers or porous fibers, and/or related methods of production, use, and/or the like. In accordance with at least certain embodiments, the present invention is directed to novel, improved, or modified microporous membranes or films, fibers, microporous fibers, materials or layers made from such membranes, fibers or porous fibers, and the like for use in textile materials, garments, products, and/or textile related applications. In accordance with at least certain selected embodiments, the present invention is directed to novel, improved, or modified microporous membranes or films, fibers or microporous fibers, such as solid or hollow fibers, microporous hollow fibers, shaped fibers, materials, layers, or textiles made from such fibers or membranes, including wovens, nonwovens, knits, bonded, flocked, and/or other textiles, laminates, composites, garments, and/or the like and which membranes, fibers, or porous fibers are preferably made of or comprised of one or more copolymers such as block copolymers or impact copolymers preferably comprising or consisting of two or more polyolefin monomer types or which membranes, fibers, or porous fibers are preferably made of a polymer such as one or more polyolefins together with one or more copolymers such as block copolymers or impact copolymers preferably comprising or consisting of two or more polyolefins. In accordance with at least particular embodiments, the present invention is directed to novel, improved or modified microporous membranes or films, fibers or microporous fibers which are comprised of a polyolefin in combination with or blended with one or more block copolymers or impact copolymers as a means of improving the composition, characteristics, performance, and/or properties of the membranes, fibers, porous fibers, materials, layers or textiles made from such membranes, fibers or porous fibers, for example, improving the characteristics, performance, and/or properties such as hand, drape, quietness, and/or surface coefficient of friction of the membranes, fibers, materials, layers or textiles such as microporous polyolefin membranes and/or polyolefin fibers in or for textiles or textile end use applications.

Conventional methods for altering the hand, drape and surface coefficient of friction of microporous polyolefin membranes typically involve coating applications which can be challenging to get to adhere and, in addition, can carry the risk that the coating may prove fugitive. The inventive approach of using a block copolymer of two or more polyolefins or using a combination or blend of polyolefin and one or more block copolymers offers a method which is permanent and produces a range of differentiated textile materials having improved performance properties such as more desirable hand, drape and surface coefficient of friction for use in a variety of textile end use applications which may also require waterproof and breathability performance, such as outerwear, disposable garments, durable garments, textile materials requiring relative humidity equalization, and/or garments or items in medical related applications.

Microporous polyolefin membranes or films can be manufactured by several methods including the dry stretch process (also known as the Celgard dry stretch process) used by Celgard, LLC of Charlotte, N.C. and by the wet process method known as a phase separation or extraction process used by Celgard Korea Inc. of South Korea, Asahi of Japan and Tonen of Japan. Microporous membranes manufactured by these processes are often made of thermoplastic polymers included, but not limited to, polyolefins such as polypropylene, polyethylene, poly 1-butene, poly-4-methyl-1 pentene and/or blends, mixtures, or combinations thereof. The choice of polyolefin or polyolefins can affect the performance properties of the membranes for certain end use applications. The polyolefin (PO) can be a homopolymer or a copolymer in composition. A homopolymer consists of one polymer while a copolymer consists of two or more polymers arranged in various sequence length distributions. For example, in the case of a copolymer, a monomer A can be copolymerized with a monomer B to form block copolymer AA/BB/AA/BB which has blocks of repeat polymeric units AA and BB. This is only one example of numerous possible arrangements of A and B polymeric units which can make up a block copolymer (BCP) or an impact copolymer (ICP). In addition, in accordance with the present invention, the composition, length, amount, order, and arrangement of the block copolymer segments AA/BB or AAAA/BBBB, for example, can influence the performance properties of hand, drape, 'quietness' with movement, and surface coefficient of friction in microporous PO/ICP, PO/BCP, ICP or BCP membranes and fibers in textile end use applications. The term 'block copolymer' is one type of copolymer or impact copolymer, with other commonly known copolymers being random and grafted copolymers.

The present methods of modification may be preferred to be cost effective and easy to control in order to facilitate custom tailoring of performance properties such as hand, soft drape, 'quietness' with movement, and lower surface coefficient of friction for use in at least certain textile garments and textile related end use application.

In accordance with at least selected embodiments, the inventive microporous membrane can be manufactured by the dry stretch process where a polyolefin resin is extruded by blown film technique or by casted film method to form a nonporous precursor film which is then cold and hot stretched in the machine direction (uniaxially) to form a microporous membrane with a final thickness typically less than 75 µm, preferably from about 12-25 µm (but may be thinner or thicker depending on the end use). In accordance with at least certain embodiments of the current inventive membrane, the polyolefin resin can be one or more block copolymers (BCPs) or impact copolymers (ICPs) which are preferably each made of polypropylene and polyethylene. Alternatively, the polyolefin resin can be extruded by blown film technique or by casted film method to form a nonporous precursor film which is then cold and/or hot stretched in both the machine and transverse directions (biaxially) to form a microporous membrane with a final thickness typically less than 75 µm, preferably from about 12-25 µm.

In accordance with a further embodiment, one or more impact copolymers consisting preferentially of polypropylene and polyethylene can be extruded by a blown film technique or by a casted film method to form a nonporous precursor film which is then cold and hot stretched initially in the machine direction (MD) and sequentially stretched in the transverse direction (TD) to form a biaxially stretched or biaxially oriented (BO) microporous membrane according to the method described in published US 2011/0223486 (herein incorporated by reference) where the biaxial stretch step includes simultaneous machine direction relax.

In accordance with a further embodiment, one or more impact copolymers consisting preferentially of polypropylene and polyethylene, can be extruded by a blown film technique or by a cast or casted film method to form a nonporous precursor film which is then cold and hot stretched initially in the machine direction and sequentially stretched in the transverse direction to form a biaxially stretched or biaxially oriented (BO) microporous membrane according to the method described in US2011/0223486 where the biaxial stretch step does not include simultaneous machine direction relax.

In accordance with a certain further embodiment, a primarily polypropylene (PP) based block copolymer (BCP) with 90-97% polypropylene content, can be compounded with a beta-nucleating (BN) agent and extruded, using a cast method, to form a nonporous beta-nucleated polypropylene based BCP precursor film. Biaxial stretching of the beta nucleated polypropylene precursor casted film fractures the interfaces which exist between regions of beta nucleated PP and regions of alpha nucleated of PP. The fracturing process forms pores in the beta-nucleated biaxially oriented polypropylene (BN-BOPP) membrane producing a microporous membrane with a thickness of less than 75 µm, preferably from about 12-25 µm.

In a further embodiment of the current inventive membrane comprised of a polyolefin (PO) in combination with one or more block or impact copolymers (BCPs or ICPs), a polyolefin combined with one or more impact or block copolymers is extruded by a blown film technique or by a casted film method to form a nonporous precursor film which is then cold and hot stretched in the machine direction (uniaxially) to form a microporous membrane or film.

In accordance with a further embodiment, a polyolefin (PO) in combination with one or more impact copolymers (ICP) can be extruded by a blown film technique or by a casted film method to form a nonporous precursor film which is then cold and hot stretched in the machine direction (MD) and sequentially stretched in the transverse direction (TD) to form a biaxially stretched or biaxially oriented (BO) microporous membrane according to the stretch method described in US 2011/0223486. The transverse stretching step includes a simultaneous machine direction relax step to produce a biaxially oriented (BO) microporous membrane.

In accordance with a further embodiment, a polyolefin (PO) in combination with one or more impact copolymers (ICP) can be extruded by a blown film technique or by a casted film method to form a nonporous precursor film which is then cold and hot stretched in the machine direction and sequentially stretched in the transverse direction to form a biaxially stretched or biaxially oriented (BO) microporous membrane according to the method described in US 2011/0223486. The transverse stretching step does not include a simultaneous machine direction relax step to produce a biaxially oriented (BO) microporous membrane.

In accordance with certain further embodiments, a polyolefin (PO) in combination with one or more impact copolymers (ICP), where the ICP is primarily a polypropylene (PP) based ICP copolymer with a 90-97% PP content, can be compounded with a beta-nucleating (BN) agent and extruded using a cast method to form a nonporous beta nucleated PO/ICP precursor. Biaxial stretching of the beta nucleated polypropylene precursor casted film fractures the interfaces which exist between regions of beta nucleated PP and regions of alpha nucleated PP. The fracturing process forms pores in the beta-nucleated biaxially oriented polypropylene (BN-BOPP) membrane producing a microporous membrane with a thickness of less than 75 µm, preferably from about 12-25 µm.

In accordance with at selected embodiments, the present invention is directed to novel, modified microporous membranes, films, fibers, or hollow fibers (or materials, layers, textiles, composites or laminates made therefrom) comprised of either 1) one or more block or impact copolymers (BCPs or ICPs) or 2) a polyolefin in combination with one or more BCPs or ICPs. The option of using one or more block or impact copolymers or of using a polyolefin in combination with one or more block or impact copolymers provides a method to produce a range of differentiated textile materials having improved performance properties such as more desirable hand, drape and surface coefficient of friction for use in a variety of textile end use applications which may also require waterproof and breathability performance, such as outerwear, disposable garments, durable garments, textile materials requiring relative humidity equalization and garments or items in medical related applications.

BRIEF DESCRIPTION OF THE DRAWINGS

FIG. 1 is a schematic representation of examples of block copolymers or impact copolymers made up of blocks of different polymerized monomers. Preferably, the block or impact copolymers (BCPs or ICPs) are made of two or more monomer types, such as, propylene and ethylene monomers.

FIG. 2 is a respective surface SEM images of the product of Example 5 at different magnifications.

FIG. 3 is a respective surface SEM images of the product of Example 5 at different magnifications.

FIG. 4 is a respective surface SEM images of the product of Example 5 at different magnifications.

FIG. 5 is a respective surface SEM images of the product of Example 5 at different magnifications.

DETAILED DESCRIPTION OF THE INVENTION

In accordance with at least selected embodiments, the present invention is directed to novel, improved, or modified porous membranes, fibers, porous fibers, products made from such membranes or fibers, and/or related methods of production, use, and/or the like. In accordance with at least certain embodiments, the present invention is directed to novel, improved, or modified microporous membranes or films, fibers, microporous fibers, hollow fibers, materials or layers made from such membranes or fibers, and the like for use in textile materials, garments, products, and/or textile related applications. In accordance with at least certain selected embodiments, the present invention is directed to novel, improved, or modified microporous membranes, fibers or microporous fibers, such as solid or hollow fibers, microporous hollow fibers, shaped fibers, materials, layers, or textiles made from such fibers or membranes, and/or the like and which membranes, fibers, films, or hollow fibers are preferably made of or comprised of one or more copolymers such as block copolymers or impact copolymers preferably comprising or consisting of two or more polyolefins or which membranes, fibers, films, or hollow fibers are preferably made of a polymer such as one or more polyolefins together with one or more copolymers such as block copolymers or impact copolymers preferably comprising or consisting of two or more polyolefins. In accordance with at least particular embodiments, the present invention is directed to novel, improved or modified microporous membranes, fibers or microporous fibers which are comprised of a polyolefin in combination with or blended with one or more block copolymers or impact copolymers as a means of improving the composition, characteristics, performance, and/or properties of the membranes, fibers, materials, layers or textiles made from such membranes or fibers, for example, improving the characteristics, performance, and/or properties such as hand, drape, quietness, and/or surface coefficient of friction of the membranes, fibers, materials, layers or textiles such as microporous polyolefin membranes and/or polyolefin fibers in or for textiles or textile end use applications. In accordance with at least particular selected embodiments, the present invention is directed to novel, improved or modified polyolefin materials or compositions in which one or more polyolefins are combined or blended with one or more block or impact copolymers. In addition, in accordance with at least particular certain embodiments, the present invention is directed to novel, improved or modified polyolefin materials or compositions in which one or more polyolefins are combined or blended with one or more block or impact copolymers, and where the blend or combination influences the performance properties of hand, drape, 'quietness' with movement, and/or surface coefficient of friction of microporous polyolefin membranes, materials, layers, and/or fibers made from such polyolefin materials or compositions and are used in or for textile products and/or textile related end use applications.

In accordance with at least selected embodiments, the present invention is directed to novel, improved, or modified, microporous membranes, fibers or microporous fibers (or layers, materials, composites, laminates, or textiles made therefrom) for use in textile garments, textile materials or textile related applications. In accordance with at least certain embodiments, the present invention is directed to novel, improved or modified microporous membranes, fibers, porous fibers, or hollow fibers which are comprised of a polyolefin made or consisting of one or more impact or block copolymers (abbreviated here as BCPs or ICPs), preferably polypropylene and polyethylene or of a polyolefin blended or mixed with one or more impact or block copolymers. FIG. 1 is a schematic representation of possible copolymer block repeat units consisting of a monomer A (represented as "A" in FIG. 1) and monomer B (represented as "B" in FIG. 1) preferably propylene and ethylene monomers.

In accordance with at least certain embodiments, the current invention is directed to novel, improved or modified microporous membranes, fibers, porous fibers, or hollow fibers comprised of one or more block copolymers (BCPs) which preferentially are made of polypropylene and polyethylene present at mole fractions between 1% and 50%, and more preferentially made of polypropylene and polyethylene present at mole fractions between 3% and 10%.

In another embodiment, the present invention is directed to novel, improved or modified microporous membranes or films, fibers, porous fibers, or hollow fibers which are comprised of a polyolefin (PO) in combination with one or more impact copolymers (ICPs). The one or more impact copolymers preferably consist of polyolefins which include but are not limited to, polypropylene, polyethylene, poly 1-butene, poly-4-methyl-1 pentene, polyhexene, polyoctene and/or blends, mixtures, or combinations thereof. When a polyolefin is combined with one or more impact copolymers, the length, amount, arrangement and order of PO/ICP polymers or segments in the inventive modified microporous membrane offers methods for designing modified microporous membranes, films, fibers, or porous fibers with targeted, enhanced performance properties in or for textile related end use applications. The mole fraction composition of polypropylene and polyethylene present in the ICP or BCP segments or in the PO/ICP or PO/BCP polymeric microporous membranes can be varied and is preferably between 1% and 50%, and more preferably between 3% and 10%. Tailoring the choice of composition, length, order, amount, and arrangement of BCP or ICP segments in the polymeric backbone or PO/ICP or PO/BCP polymers in the chemical structure of the polymer blend or mixture or composition of the inventive modified microporous membrane can influence membrane or product performance properties such as hand, drape, 'quietness' with movement, and surface coefficient of friction producing microporous polyolefin membranes with softer drape, quieter movement and lower coefficient of friction, for example, resulting in a silkier touch.

In accordance with at least selected embodiments, the present invention is directed to novel, improved, or modified porous membranes, fibers, porous fibers, products made from such membranes, fibers or porous fibers, and/or related methods of production, use, and/or the like. In accordance with at least certain embodiments, the present invention is directed to novel, improved, or modified microporous membranes or films, fibers, microporous fibers, materials or layers made from such membranes, fibers or porous fibers, and the like for use in textile materials, garments, products, and/or textile related applications. In accordance with at least certain selected embodiments, the present invention is directed to novel, improved, or modified microporous membranes or films, fibers or microporous fibers, such as solid or hollow fibers, microporous hollow fibers, shaped fibers, materials, layers, or textiles made from such fibers or membranes, including wovens, nonwovens, knits, bonded, flocked, and/or other textiles, laminates, composites, garments, and/or the like and which membranes, fibers, or porous fibers are preferably made of or comprised of one or more copolymers such as block copolymers or impact copolymers preferably comprising or consisting of two or more polyolefin monomer types or which membranes, fibers, or porous fibers are preferably made of a polymer such as one or more polyolefins together with one or more copolymers such as block copolymers or impact copolymers preferably comprising or consisting of two or more polyolefins. In accordance with at least particular embodiments, the present invention is directed to novel, improved or modified microporous membranes or films, fibers or microporous fibers which are comprised of a polyolefin in combination with or blended with one or more block copolymers or impact copolymers as a means of improving the composition, characteristics, performance, and/or properties of the membranes, fibers, porous fibers, materials, layers or textiles made from such membranes, fibers or porous fibers, for example, improving the characteristics, performance, and/or properties such as hand, drape, quietness, and/or surface coefficient of friction of the membranes, fibers, materials, layers or textiles such as microporous polyolefin membranes and/or polyolefin fibers in or for textiles or textile end use applications.

Microporous polyolefin membranes can be manufactured by several methods and may be made of thermoplastic polymers including, but not limited to, polyolefins such as polypropylene, polyethylene, poly 1-butene, poly-4-methyl-1 pentene and/or blends, mixtures, or combinations thereof. The choice of polyolefin(s) can affect the performance properties of the membranes in certain end use applications. The polyolefin (PO) can be a homopolymer or a copolymer in composition. The composition, length, order, amount, and arrangement of copolymer or impact or block copolymers can influence the performance properties of hand, drape, 'quietness' with movement, and surface coefficient of friction in microporous polyolefin membranes and/or fibers for or in textile products or end use applications. In the inventive membrane or fiber, the mole fraction composition of polypropylene and polyethylene present in the BCP or ICP or in the ICP or BCP portion of the PO/ICP or PO/BCP polymeric microporous membrane can be varied and is preferably between 1% and 50%, and more preferably between 3% and 10%.

In accordance with at least selected embodiments, the inventive microporous membrane can be manufactured by the dry stretch process where the polyolefin resin is extruded using a blown film technique or using a casted film method to form a nonporous precursor film which is then cold and/or hot stretched in the machine direction (uniaxially) to form a microporous membrane with a final thickness typically less than 75 μm, preferably from about 12-25 μm. In accordance with at least certain embodiments of the current inventive membrane, the polyolefin resin can be an impact copolymer (ICP) or block copolymer (BCP) which is preferably made of polypropylene and polyethylene. The ICP or BCP can be extruded by blown film technique or by casted film method to form a nonporous precursor film which is then cold and hot stretched in the machine direction (uniaxially) to form a microporous membrane with a final thickness typically less than 75 μm, preferably from about 12-25 μm.

In accordance with a further embodiment, one or more impact copolymers ICPs consisting preferentially of polypropylene and polyethylene at a mole fraction content preferably between 1% and 50%, and more preferably between 3% and 10%, are extruded using a blown film technique or using a casted film method to form a nonporous precursor film which is then cold and hot stretched initially in the machine direction and sequentially stretched in the transverse (TD) direction to form a biaxially stretched or biaxially oriented (BO) microporous membrane according to the method described in US2011/0223486. The transverse stretching step includes a simultaneous machine direction relax step and produces a biaxially oriented (BO) microporous membrane with a final thickness typically less than 75 μm, preferably from 10-40 μm, more preferably 15-30 μm, and most preferably about 8-20 μm.

In accordance with a further embodiment, one or more impact copolymers (ICP) which consist preferentially of polypropylene and polyethylene at a mole fraction content preferably between 1% and 50%, and more preferably between 3% and 10%, are extruded using a blown film technique or using a casted film method to form a nonporous precursor film which is then cold and hot stretched initially in the machine direction and sequentially stretched in the transverse (TD) direction to form a biaxially stretched or biaxially oriented (BO) microporous membrane according to the method described in US2011/0223486. The transverse stretching step does not include a simultaneous machine direction relax step and produces a biaxially oriented (BO) microporous membrane with a final thickness typically less than 75 μm, preferably from 10-40 μm, more preferably 15-30 μm, and most preferably 8-20 μm.

In accordance with a certain further embodiment, a primarily polypropylene based impact copolymer (ICP) with 90-97% polypropylene content, can be compounded with a beta-nucleating (BN) agent and extruded using a cast method to form a nonporous beta-nucleated polypropylene based ICP precursor film which is less than 300 μm, preferably less than 150 μm, in thickness. Polypropylene is a polymorphic semi-crystalline polymer which can crystallize in alpha and beta crystalline forms which have different densities.

Beta nucleating agents convert polypropylene from the more common alpha (a) crystal state to the less common beta (13) crystal state when polypropylene is extruded and cast onto a roll which is maintained at a controlled temperature specifically selected to optimize beta crystal growth. Biaxial stretching of the beta nucleated polypropylene based ICP precursor film fractures the interfaces which exist between regions of beta nucleated PP and a nucleated PP. The fracturing process at the interfaces between the β nucleated PP and a nucleated PP regions forms micropores and the result is a beta-nucleated biaxially oriented polypropylene (BN-BOPP) membrane with a thickness of less than 75 μm, preferably from 12-25 μm.

A further embodiment of the current inventive membrane comprised of a polyolefin (PO) in combination with one or more impact copolymers (ICP) is extruded using a blown film technique or using a casted film method to form a nonporous precursor film which is then cold and hot stretched in the machine direction (uniaxially) to form a microporous membrane with a final thickness typically less than 75 μm, preferably from about 12-25 μm.

In accordance with a further embodiment of the current inventive membrane comprised of a polyolefin (PO) in combination with one or more impact copolymers (ICP) is extruded using a blown film technique or using a casted film method to form a nonporous precursor film which is then cold and hot stretched the machine direction and sequentially stretched in the transverse (TD) direction to form a biaxially stretched or biaxially oriented (BO) microporous membrane according to the method described in US 2011/0223486. The transverse stretching step includes a simultaneous machine direction relax step which produces a biaxially oriented (BO) microporous membrane with a final thickness typically less than 75 μm, preferably from 10-40 μm, more preferably 15-30 μm, and most preferably 8-20 μm.

In accordance with a further embodiment of the current inventive membrane comprised of a polyolefin (PO) in combination with one or more impact copolymers (ICP) is extruded using a blown film technique or using a casted film method to form a nonporous precursor film which is then cold and hot stretched the machine direction and sequentially stretched in the transverse direction to form a biaxially stretched or biaxially oriented (BO) microporous membrane according to the method described in US 2011/0223486. The transverse stretching step does not include a simultaneous machine direction relax step which produces a biaxially oriented (BO) microporous membrane with a final thickness typically less than 75 μm, preferably from 10-40 μm, more preferably 15-30 μm, and most preferably 8-20 μm.

In accordance with a certain further embodiments, a polyolefin (PO) in combination with one or more impact copolymers (ICP)(or BCP), where the ICP is primarily a polypropylene based ICP copolymer with a 90-97% PP content, can be compounded with a beta-nucleating (BN) agent and extruded using a cast method to form a nonporous beta nucleated PO/BCP precursor film which is less than 300 μm in thickness. Polypropylene is a polymorphic semi-crystalline polymer which can crystallize in alpha and beta crystalline forms which have different densities. Beta nucleating agents convert polypropylene from the more common alpha (α) crystal state to the less common beta (β) crystal state when polypropylene is extruded and cast onto a roll which is maintained at a controlled temperature specifically selected to optimize beta crystal growth. Biaxial stretching of the beta nucleated polypropylene based ICP precursor film fractures the interfaces which exist between regions of beta nucleated PP and α nucleated PP. The fracturing process at the interfaces between the β nucleated PP and α nucleated PP regions forms micropores and the result is a beta-nucleated biaxially oriented polypropylene (BN-BOPP) membrane with a thickness of less than 75 μm, preferably from 12-25 μm.

In accordance with at selected embodiments, the present invention is directed to novel, modified microporous membranes, fibers, porous fibers, or microporous hollow fibers comprised of either 1) an impact copolymer (ICP)(or BCP) consisting of two or more polyolefins or 2) a polyolefin in combination with an impact copolymer (ICP)(or BCP) consisting of two or more polyolefins. The option of using an impact copolymer (ICP) or of using a polyolefin in combination with one or more impact copolymers (ICP) provides a method to produce a range of differentiated textile materials having improved performance properties such as more desirable hand, drape and surface coefficient of friction for use in a variety of textile end use applications which also require waterproof and breathability performance, such as outerwear, disposable garments, durable garments, textile materials requiring relative humidity equalization and garments/items in medical related applications.

Many other modifications and variations of the present invention are possible to the skilled practitioner in the field in light of the teachings herein. It is therefore understood that, within the scope of the claims, the present invention can be practiced other than as herein specifically described.

EXAMPLES

Example 1

An impact copolymer polyolefin resin is melt extruded to from a nonporous precursor membrane 25 μm in thickness. The nonporous precursor membrane is then stretched uniaxially in the machine direction (MD) to produce a microporous film which is 20.8 μm in thickness and has a JIS Gurley value=1354 seconds. Table 1 lists the properties of the inventive microporous film in Example 1.

TABLE 1

Physical Properties of Example 1.

| Property | Value |
| --- | --- |
| Thickness, μm | 20.8 |
| JIS Gurley, s | 1354 |
| Basis weight, g/m$^2$ | 10.4 |

TABLE 1-continued

Physical Properties of Example 1.

| Property | Value |
| --- | --- |
| % MD shrinkage 90° C./1 hour | 12.1 |
| MD tensile stress, kgf/cm$^2$ | 1538 |
| TD tensile stress, kgf/cm$^2$ | 163.8 |
| % MD elongation, | 52.4 |
| % TD elongation, | 651.9 |

Example 2

According to the same manner as that described in Example 1, the uniaxially stretched microporous membrane produced in Example 1 was biaxially stretched in transverse direction (TD) stretching device without machine direction (MD) relax. The TD stretched membrane was stretched in the TD direction 2 to 4 times its input width. The resulting microporous membrane had a JIS Gurley<100 which is acceptable level of air permeability to function as a breathable textile membrane.

Example 3

According to the same manner as that described in Example 1, the uniaxially stretched microporous membrane produced in Example was biaxially stretched in transverse direction (TD) stretching as described in US 2011/0223486 with a simultaneous Machine direction relax step. TD stretching at 4.5× stretch and a 0-16% overall MD relax produced a microporous membrane with a thickness of 10.9 μm and a JIS Gurley values=73 seconds. Table 2 lists the physical properties of the inventive microporous film in Example 3.

TABLE 2

Physical Properties of Example 3.

| Property | Value |
| --- | --- |
| Thickness, μm | 10.9 |
| JIS Gurley, s | 73 |
| Basis weight, g/m$^2$ | 2.6 |
| % MD shrinkage 90° C./1 hour | 6.6 |
| % TD shrinkage 90° C./1 hour | 0.87 |
| Puncture strength, g | 69.9 |
| MD tensile stress, kgf/cm$^2$ | 397.6 |
| TD tensile stress, kgf/cm$^2$ | 393.3 |
| % MD elongation | 67.9 |
| % TD elongation | 43.1 |

Example 4

An impact copolymer polyolefin resin is melt extruded to form a nonporous precursor membrane 35 μm in thickness. The nonporous precursor membrane is then stretched uniaxially in the machine direction (MD) to produce a microporous film which is 26 μm in thickness and has a JIS Gurley value=3,454 seconds. Table 3 lists the properties of the inventive microporous film in Example 4.

TABLE 3

Physical Properties of Example 4.

| Property | Value |
| --- | --- |
| Thickness, μm | 26 |
| JIS Gurley, s | 3454 |
| Basis weight, g/m$^2$ | 15.5 |
| % MD shrinkage 90° C./1 hour | 0.6 |
| MD tensile stress, kgf/cm$^2$ | 1612 |
| TD tensile stress, kgf/cm$^2$ | 194 |
| % MD elongation, | 78.2 |
| % TD elongation, | 685.8 |

Example 5

According to the same manner as that described in Example 4, a uniaxially stretched microporous membrane 26 μm thick, produced similarly to Example 3 was biaxially stretched in transverse direction (TD) stretching as described in US 2011/0223486 with a simultaneous machine direction relax step. TD stretching at 4.5× stretch and a 0-16% overall MD relax produced a microporous membrane with a thickness of 19 μm and a JIS Gurley values=25 seconds.

TABLE 4

Physical Properties of Example 5.

| Property | Value |
| --- | --- |
| Thickness, μm | 19 |
| JIS Gurley, s | 25 |
| Basis weight, g/m$^2$ | 4.0 |
| % MD shrinkage 90° C./1 hour | 5.7 |
| % TD shrinkage 90° C./1 hour | 4.2 |
| Puncture strength, g | 124 |
| MD tensile stress, kgf/cm$^2$ | 561.0 |
| TD tensile stress, kgf/cm$^2$ | 266.3 |
| % MD elongation | 120.5 |
| % TD elongation | 58.8 |

TEST METHODS

Gurley is defined as the Japanese Industrial Standard (JIS Gurley) and is measured using the OHKEN permeability tester. JIS Gurley is defined as the time in seconds required for 100 cc of air to pass through one square inch of film at a constant pressure of 4.9 inches of water.

Thickness is measured in micrometers, μm, using the Emveco Microgage 210-A micrometer thickness tester and test procedure ASTM D374.

Machine Direction (MD) and Transverse Direction (TD) tensile strength are measured using Instron Model 4201 according to ASTM-882 procedure.

% MD elongation at break is the percentage of extension of a test sample along the machine direction of the test sample measured at the maximum tensile strength needed to break a sample.

% TD elongation at break is the percentage of extension of a test sample along the transverse direction of the test sample measured at the maximum tensile strength needed to break a sample.

Puncture Strength is measured using Instron Model 4442 based on ASTM D3763. The measurements are made across the width of the microporous membrane and the puncture strength defined as the force required to puncture the test sample.

Basis Weight the weight per unit sample area of a material and can be expressed in grams/meter squared. It is the weight in grams of a test sample of known area in meters squared.

% Shrinkage is measured by placing a sample in an oven at 90 deg C. for 1 hour. Shrinkage has been measured in both Machine Direction (MD) and Transverse Direction (TD).

When a polyolefin is combined with one or more impact or block copolymers, the length, amount, arrangement, and order of polyolefin and impact copolymers in the chemical structure of the polymer makeup of the inventive modified microporous membrane offers methods for designing modified microporous membranes or films, fibers, porous fibers, or hollow fibers with targeted, enhanced performance properties in textile related end use applications.

Certain microporous polyolefin membranes are highly hydrophobic and exceptionally breathable, which makes them ideal as the barrier layer in waterproof/breathable textiles such as high-performance outerwear. Traditionally, in the development of such polyolefin films, raw material polymers have been selected, among other factors, with a view toward providing physically robust films. This has resulted in stiffer films that tend to crinkle, thus providing less than ideal "hand" (i.e. tactile experience). In accordance with the present invention, one method for improving the hand of such PO films is to use a polypropylene/polyethylene block copolymer resin.

PP/PE block copolymers are available from various resin manufacturers. By using a block copolymer that includes at least a small percentage of PE (preferably less than 5%), the resulting film is less stiff, thus giving a softer drape and quieter movement, and also has a lower coefficient of friction, thus giving a silkier touch. Also, such block copolymer films appear to be suitable for TD stretching and 60 inch wide (or wider) porous films for textile applications can be made.

In accordance with one example, a microcreped microporous polymer membrane, such as a polyolefin microporous membrane is laminated to a porous polymer non-woven material or mesh, such as a polyolefin non-woven mesh, then microcreped.

In accordance with certain other non-limiting examples, here is a list of selected possible products, laminates, combinations, embodiments, or examples using the inventive porous membrane or fiber layer:

1.) Inventive porous membrane or fiber layer+PE or PP non-woven
2.) Face fabric+Inventive porous membrane or fiber layer+PE or PP non-woven inner layer
3.) PE or PP non-woven+Inventive porous membrane or fiber layer+PE or PP non-woven
4.) Face fabric+Inventive porous membrane or fiber layer+Fabric inner layer
5.) Face fabric+two layers of Inventive porous membrane or fiber layer+Fabric inner layer
6.) Face fabric+PP non-woven+Inventive porous membrane or fiber layer+Fabric inner layer
7.) Face fabric+Inventive porous membrane or fiber layer
8.) Inventive porous membrane or fiber layer+Adhesive+PE or PP non-woven
9.) Face fabric+Adhesive+Inventive porous membrane or fiber layer+PE or PP non-woven inner layer
10.) Face fabric+Adhesive+Inventive porous membrane or fiber layer+Adhesive+PE or PP non-woven inner layer
11.) Face fabric+Inventive porous membrane or fiber layer+Adhesive+PE or PP non-woven inner layer 12.) PE or PP non-woven+Adhesive+Inventive porous membrane or fiber layer+PE or PP non-woven
13.) PE or PP non-woven+Adhesive+Inventive porous membrane or fiber layer+Adhesive+PE or PP non-woven
14.) PE or PP non-woven+Inventive porous membrane or fiber layer+Adhesive+PE or PP non-woven
15.) Face fabric+Adhesive+Inventive porous membrane or fiber layer+Fabric inner layer
16.) Face fabric+Inventive porous membrane or fiber layer+Adhesive+Fabric inner layer
17.) Face fabric+Adhesive+Inventive porous membrane or fiber layer+Adhesive+Fabric inner layer
18.) Face fabric+two layers of Inventive porous membrane or fiber layer
19.) Face fabric+Adhesive+two layers of Inventive porous membrane or fiber layer
20.) Face fabric+Adhesive+two layers of Inventive porous membrane or fiber layer+Fabric inner layer
21.) Face fabric+two layers of Inventive porous membrane or fiber layer+Adhesive+Fabric inner layer
22.) Face fabric+Adhesive+two layers of Inventive porous membrane or fiber layer+Adhesive+Fabric inner layer
23.) Face fabric+Adhesive+Inventive porous membrane or fiber layer+Adhesive+Inventive porous membrane or fiber layer+Adhesive+Fabric inner layer
24.) Face fabric+Adhesive+PP non-woven+Inventive porous membrane or fiber layer
25.) Face fabric+Adhesive+PP non-woven+Adhesive+Inventive porous membrane or fiber layer
26.) Face fabric+PP non-woven+Adhesive+Inventive porous membrane or fiber layer
27.) Face fabric+Adhesive+PP non-woven+Inventive porous membrane or fiber layer+Fabric inner layer
28.) Face fabric+PP non-woven+Inventive porous membrane or fiber layer+Adhesive+Fabric inner layer
29.) Face fabric+Adhesive+PP non-woven+Inventive porous membrane or fiber layer+Adhesive+Fabric inner layer
30.) Face fabric+Adhesive+PP non-woven+Adhesive+Inventive porous membrane or fiber layer+Adhesive+Fabric inner layer
31.) Face fabric+Adhesive+Inventive porous membrane or fiber layer In accordance with at least selected embodiments, the present invention is directed to novel, improved, or modified porous membranes, fibers, products, and/or related methods. In accordance with at least certain embodiments, the present invention is directed to novel, improved or modified microporous membranes, fibers, and the like for use in textile materials, garments, products, and/or textile related applications. In accordance with at least certain selected embodiments, the present invention is directed to novel, improved, or modified microporous membranes, fibers, porous fibers, or microporous hollow fibers which are made of or comprised of a copolymer such as an impact copolymer comprising or consisting of two or more polyolefins. In accordance with at least particular embodiments, the present invention is directed to novel, improved or modified microporous membranes, fibers, porous fibers or hollow fibers which are comprised of a polyolefin in combination with one or more impact copolymers as a means of improving the composition, characteristics, performance and/or properties of the material or textile such as hand, drape and surface coefficient of friction of the microporous polyolefin membranes and/or fibers in or for textile end use applications. In addition, a polyolefin can be combined or blended with one or more impact copolymers, where the length, amount, arrangement and order of the polyolefin and/or impact copolymers in the chemical structure of the polymer mix of the inventive modified microporous membranes and fibers influences the performance properties of hand, drape, 'quietness' with movement, and/or surface coefficient of friction of the microporous polyolefin membranes and/or fibers in or for textile products and/or end use applications.

The preferred inventive laminated or composite microporous membrane may be further improved, treated or modified using a technique or treatment such as a coating or microcreping to introduce permanent small, regularly spaced, crepes, profiles, compactions, pleats, or wrinkles into the laminated or composite microporous membrane for the purpose of improving mechanical strength, elasticity and/or resiliency. In addition, the inventive microcreped microporous laminated membrane may have improved 'hand' or softness, improved 'next-to-the-skin' softness, and/or is quiet without crinkling noises during movement, which may be desired performance properties or characteristics of or in textile garments, materials or applications.

In accordance with at least selected embodiments, objects or aspects of the present invention, there are provided novel, improved, or modified porous membranes, fibers, products, and/or related methods, novel, improved, or modified microporous membranes, fibers, and the like for use in textile materials, garments, products, and/or textile related applications, novel, improved, or modified microporous membranes or films, fibers, porous fibers, or hollow fibers which are made of or comprised of a copolymer such as an impact copolymer comprising or consisting of two or more polyolefins, novel, improved or modified microporous membranes or films, fibers, porous fibers, or hollow fibers (or articles, layers, composites, laminates, materials, textiles, or the like made therefrom) which are comprised of a polyolefin in combination with one or more impact copolymers as a means of improving the composition, characteristics, performance and/or properties of the material or textile such as hand, drape and surface coefficient of friction of the microporous polyolefin membranes and/or fibers in or for textile end use applications, a polyolefin can be combined or blended with one or more impact copolymers, where the blend or combination influences the performance properties of hand, drape, 'quietness' with movement, and/or surface coefficient of friction of the microporous polyolefin membranes and/or fibers in or for textile products and/or end use applications, and/or the like.

In at least one embodiment, microporous membranes, fibers, and/or microporous fibers are made of one or more copolymers, such as block or impact copolymers, or of at least one polyolefin combined with at least one copolymer as a means of improving the hand, drape, and/or surface coefficient of friction performance properties for use in textile garments, textile materials or textile related applications.

In accordance with at least selected embodiments, objects or aspects, the present invention is directed to novel, improved, or modified porous membranes, fibers, porous fibers, products made from such membranes, fibers or porous fibers, and/or related methods of production, use, and/or the like, microporous membranes or films, fibers, microporous fibers, materials or layers made from such membranes, fibers or porous fibers, and the like for use in textile materials, garments, products, and/or textile related applications, microporous membranes or films, fibers or microporous fibers, such as solid or hollow fibers, microporous hollow fibers, shaped fibers, materials, layers, or textiles made from such fibers or membranes, including wovens, nonwovens, knits, bonded, flocked, and/or other textiles, laminates, composites, garments, and/or the like and which membranes, fibers, or porous fibers preferably made of or comprised of one or more copolymers such as block copolymers or impact copolymers preferably comprising or consisting of two or more polyolefin monomer types or which membranes, fibers, or porous fibers are preferably made of a polymer such as one or more polyolefins together with one or more copolymers such as block copolymers or impact copolymers preferably comprising or consisting of two or more polyolefins, microporous membranes or films, fibers, porous fibers, hollow fibers, or microporous fibers which are comprised of a polyolefin in combination with or blended with one or more block copolymers or impact copolymers as a means of improving the composition, characteristics, performance, and/or properties of the membranes, fibers, porous fibers, materials, layers or textiles made from such membranes, fibers or porous fibers, for example, improving the characteristics, performance, and/or properties such as hand, drape, quietness, and/or surface coefficient of friction of the membranes, fibers, materials, layers or textiles such as microporous polyolefin membranes and/or polyolefin fibers in or for textiles or textile end use applications.

In accordance with selected embodiments or examples, the instant application relates to new or improved microporous membranes, new or improved porous membrane wipes, new or improved microporous membrane wipes, and/or methods of manufacture, marketing, and/or use thereof. The instant invention is directed toward a new or improved method for oil blotting utilizing a microporous membrane wipe, like use in blotting oil from one's skin or face, and/or the removal of fingerprint, smudges and the like from other surfaces like eyeglasses; electronics; cell phones; displays, optical devices, camera lenses, microscope lenses and other precision optics, and/or the like. In at least selected embodiments, the microporous membrane wipes may be microporous membranes made from impact copolymers of polyethylene and/or polypropylene. In at least selected other embodiments, the microporous membrane wipes may be a biaxially oriented microporous membrane made from impact copolymers of polyethylene and/or polypropylene.

In another embodiment, the microporous membrane wipes of the instant invention may be used for cleaning surfaces of oil, fingerprints, smudges, etc, including, but not limited to, eyeglasses; electronics; cell phones; displays, optical devices, camera lenses, microscope lenses and other precision optics, the like, etc. Some desired features of the microporous membrane wipes of the instant invention being used as surface cleaners may include, but are not limited to, the following: designed for delicate tasks; low lint; non-abrasive; pleasant to the touch; absorbs oil without leaving oily residue on the fingers; provides visual indication of the absorbed oil; and anti-static dispensing. The microporous membrane wipes of the instant invention have been found to work extremely well as a lint free technical wipe for optics and other technical needs. Fingerprints, smudges, and the like on display screens, eyeglasses, and similar surfaces are largely oil-based. Consequently, the instant microporous membrane wipes may work particularly well as wipes for these surfaces because of their oil absorption properties. The microporous membrane wipes may also have the additional benefits of being very soft to the touch and having very high porosity, thus enhancing its absorptive properties. Similar to the applications that Kimwipes® are typically used for, the instant microporous membrane wipes, and particularly biaxially stretched impact copolymer membrane wipes, could find wide use as clean room wipes, wipes for high precision optics, or even in consumer products as disposable eyeglass wipes in lieu of microfiber cleaning cloths.

In one embodiment, the microporous membrane wipes of the instant invention could be biaxially-oriented Celgard membranes, such as those disclosed in US Patent Publication Nos. 20070196638 and 20110223486 (each hereby incorporated by reference herein). Such biaxially-oriented membranes may be preferred as they may perform even better as skin oil blotters than uniaxially-oriented Celgard membranes because biaxial orientation increases the membranes' porosity. Moreover, biaxially-oriented Celgard membranes made from block copolymers of polyethylene and polypropylene have the additional advantage of exceptionally pleasant touch, relative both to Celgard membranes made from pure polypropylene and to commercially available skin oil blotters. However, the invention is not so limited to the preferred biaxially-oriented microporous membrane wipes, and uniaxially-oriented microporous membrane wipes may also be used as the microporous membrane wipes of the instant invention.

In one embodiment, the microporous membrane wipe may be made by a dry-stretch process and have substantially round shaped pores and a ratio of machine direction tensile strength to transverse direction tensile strength in the range of 0.5 to 4.0. The microporous membrane wipe may be a thin, pliable, polymeric sheet, foil, or film having a plurality of pores therethrough.

In a possibly preferred embodiment, the polymers used in the instant microporous membrane wipes may be impact copolymers (PP with EPR).

In other select embodiments, the instant wipe may include other ingredients. For example, those ingredients may include: fillers (inert particulates used to reduce the cost of the wipe, but otherwise having no significant impact on the manufacture of the wipe or its physical properties), anti-static agents, anti-blocking agents, anti-oxidants, lubricants (to facilitate manufacture), and the like.

Example 6

A PP based impact copolymer is extruded to form a film. Extruder melt temperature is 249° C. Polymer melt is fed to an extrusion die set at 215° C. The polymer melt is cooled by blowing air. The extruded film has a thickness of 34 µm and birefringence of 0.0116. The extruded precursor is then annealed at 154° C. for 2 minutes. The annealed film is then cold stretched to 30% at room temperature and hot stretched 190% and relaxed 61% at 140° C. (total machine direction stretch=159%). The MD stretched film has a thickness of 26 µm and porosity of 40%. The MD stretched film is then TD stretched 260% at 150° C. with 50% MD relax, followed by a simultaneous MD and TD stretch of 50% and 216%, respectively, at 150° C.

Example 6 Data

In the following table the results of Example 6 are summarized and compared to two commercially available dry-stretched films: A) CELGARD® 2400 (single ply polypropylene wipe); and B) CELGARD® 2325 (tri-layer polypropylene/polyethylene/polypropylene).

TABLE 5

Example 6

| | TD stretching | Thickness (um) | Porosity | TD Tensile strength (kg/cm$^2$) | MD Tensile strength (kg/cm$^2$) | MD/TD tensile ratio |
|---|---|---|---|---|---|---|
| A | N/A | 25.4 | 37% | 160 | 1700 | 10.6 |
| B | N/A | 25.1 | 40% | 146 | 1925 | 13.2 |
| Ex 6 | 450% | 17 | 73% | 287 | 558 | 1.9 |

With respect to at least certain embodiments directed to battery separators, there may be a need for further strengthen or enhance at least certain battery separators, particularly as the materials become thinner. One way to obtain materials in the 1-10 μm range is through transverse direction (TD) stretching. Biaxial stretching can provide transverse strength that may be lost with uniaxial stretching.

As battery separator materials are stretched in a biaxial manner, new materials may be used for further beneficial effect. Use of impact copolymer materials can be quite effective either alone or in combination with other isotactic polypropylene materials. In the case of blended polymers, using 1-80% impact copolymer, more preferably 5-30% impact copolymer may be beneficial as the copolymer material leads to even greater tensile strength and elongation with respect to a porous stretched material, and may provide a greater process window.

Separators made this way can be made in a laminated trilayer fashion, coextruded fashion, or monolayer fashion. These materials may be preferentially made to be coated with some sort of polymer or ceramic coating before use in a battery.

Many other modifications and/or variations of the present invention are possible to the skilled practitioner in the field in light of the teachings herein. It is therefore understood that other embodiments or examples are contemplated and that, within the scope of the claims, the present invention can be practiced other than as herein specifically described.

What is claimed is:

1. A battery separator comprising at least one microporous polyolefin membrane includes: at least one of: a block or impact copolymer comprising or consisting of two or more polyolefins, and a polyolefin in combination with one or more block or impact copolymers wherein a tensile strength of the microporous polyolefin membrane with the at least one block or impact copolymer is greater than a tensile strength of a microporous polyolefin membrane without the at least one block or impact copolymer; and wherein said polyolefin in combination with one or more block or impact copolymers uses either 1-80% impact copolymer or 5-30% impact copolymer.

2. The battery separator of claim 1 wherein said at least one microporous polyolefin membrane comprises impact copolymer either alone or in combination with isotactic polypropylene.

3. The battery separator of claim 1 wherein said at least one microporous polyolefin membrane comprises a monolayer, a laminated trilayer, or a coextruded trilayer.

4. The battery separator of claim 1 wherein said at least one microporous polyolefin membrane is coated with a polymer or ceramic coating before use in a battery.

5. The battery separator of claim 1 wherein said microporous polyolefin membrane has a thickness of about 10-30 μm.

6. The battery separator of claim 1 wherein said microporous polyolefin membrane has a thickness of about 15-25 μm.

7. The battery separator of claim 1 wherein said at least one block or impact copolymer is made of propylene and ethylene monomers.

* * * * *